United States Patent
Godon et al.

(10) Patent No.: US 9,539,787 B2
(45) Date of Patent: Jan. 10, 2017

(54) MULTILAYER WOVEN FIBROUS STRUCTURE INCLUDING A HOLLOW TUBULAR PART, PRODUCTION METHOD THEREOF AND COMPOSITE PART COMPRISING SAME

(75) Inventors: Thierry Godon, Sevran (FR); Bruno Jacques Gerard Dambrine, Le Chatelet en Brie (FR)

(73) Assignee: SNECMA, Paris (FR)

( * ) Notice: Subject to any disclaimer, the term of this patent is extended or adjusted under 35 U.S.C. 154(b) by 453 days.

(21) Appl. No.: 13/980,128

(22) PCT Filed: Jan. 13, 2012

(86) PCT No.: PCT/FR2012/050087
§ 371 (c)(1),
(2), (4) Date: Jul. 17, 2013

(87) PCT Pub. No.: WO2012/098327
PCT Pub. Date: Jul. 26, 2012

(65) Prior Publication Data
US 2013/0295302 A1    Nov. 7, 2013

(30) Foreign Application Priority Data
Jan. 21, 2011   (FR) ...................... 11 50499

(51) Int. Cl.
*D03D 25/00*   (2006.01)
*D03D 11/00*   (2006.01)
(Continued)

(52) U.S. Cl.
CPC . *B32B 1/08* (2013.01); *D03D 3/00* (2013.01); *D03D 3/02* (2013.01); *D03D 11/00* (2013.01);
(Continued)

(58) Field of Classification Search
CPC .... D03D 25/005; D03D 41/004; D03D 11/02; D03D 11/00; D03D 13/00; D03D 1/00; D03D 13/004; D03D 25/00; D03D 41/00; D03D 23/00; D03D 3/00; D03D 3/02; B32B 1/08; B32B 2250/20; B32B 2605/18; B32B 5/024; B32B 5/22; D04C 1/06
See application file for complete search history.

(56) References Cited

U.S. PATENT DOCUMENTS 4,336,296 A * 6/1982 Fukuta ................ B29C 70/24
139/383 B
4,346,741 A   8/1982 Banos et al.
(Continued)

FOREIGN PATENT DOCUMENTS

JP    1 052845    2/1989

OTHER PUBLICATIONS

International Search Report Issued Apr. 5, 2012 in PCT/FR12/050087 Filed Jan. 13, 2012.

*Primary Examiner* — Bobby Muromoto, Jr.
(74) *Attorney, Agent, or Firm* — Oblon, McClelland, Maier & Neustadt, L.L.P.

(57) ABSTRACT

A fiber structure made as a single piece by multilayer weaving using a method including weaving warp yarns of at least a first set of layers of warp yarns with weft yarns including at least some that are woven with extra length so as to have warp yarn end portions available that extend beyond the zone of weaving, the warp yarn end portions being returned to be woven with warp yarns by being reinserted in layers of warp yarns, and a hollow, or tubular, portion being formed by looping the first woven set of layers of warp yarns back onto itself and applying traction to the ends of the reinserted weft yarns so that a fiber preform for (Continued)

a part including a hollow portion can be obtained as a single piece.

10 Claims, 10 Drawing Sheets

(51) Int. Cl.
  *B32B 1/08* (2006.01)
  *D03D 3/00* (2006.01)
  *D03D 3/02* (2006.01)
(52) U.S. Cl.
  CPC ......... *D03D 25/005* (2013.01); *D10B 2505/02* (2013.01); *Y02T 50/433* (2013.01); *Y10T 428/13* (2015.01)

(56) References Cited

U.S. PATENT DOCUMENTS

| | | | | | |
|---|---|---|---|---|---|
| 4,379,798 | A * | 4/1983 | Palmer | | B29C 70/24 428/113 |
| 4,686,134 | A * | 8/1987 | Ono | | B29C 70/207 428/105 |
| 4,725,485 | A * | 2/1988 | Hirokawa | | D03D 25/005 139/DIG. 1 |
| 4,782,864 | A * | 11/1988 | Abildskov | | B29C 65/5071 139/384 R |
| 5,024,874 | A * | 6/1991 | Yasui | | B29C 70/24 139/DIG. 1 |
| 5,130,188 | A * | 7/1992 | Anahara | | D03D 25/005 428/222 |
| 5,173,358 | A * | 12/1992 | Anahara | | B29C 70/24 139/DIG. 1 |
| 5,308,228 | A * | 5/1994 | Benoit | | B29C 70/543 156/93 |
| 7,241,112 | B2 * | 7/2007 | Dambrine | | B29C 70/48 29/889.7 |
| 7,484,539 | B1 | 2/2009 | Huang | | |
| 7,581,932 | B2 * | 9/2009 | Coupe | | B29B 11/16 264/257 |
| 7,690,164 | B2 * | 4/2010 | Walker | | B29C 70/68 248/637 |
| 7,926,761 | B2 * | 4/2011 | Coupe | | B29C 70/24 244/102 A |
| 8,322,971 | B2 * | 12/2012 | Coupe | | B29C 70/24 139/384 R |
| 8,448,837 | B2 * | 5/2013 | Dambrine | | B22F 3/15 228/121 |
| 8,491,740 | B2 * | 7/2013 | Serey | | B29C 70/24 156/148 |
| 8,505,588 | B2 * | 8/2013 | Coupe | | D03D 25/005 139/11 |
| 8,685,868 | B2 * | 4/2014 | Bouillon | | B29C 70/24 139/384 R |
| 8,980,031 | B2 * | 3/2015 | Dambrine | | B29C 70/48 156/148 |
| 9,199,331 | B2 * | 12/2015 | Godon | | C22C 14/00 |
| 9,200,385 | B2 * | 12/2015 | Dambrine | | D03C 3/38 |
| 9,315,927 | B2 * | 4/2016 | Dambrine | | D03D 25/00 |
| 9,321,106 | B2 * | 4/2016 | Godon | | B22F 3/15 |
| 2005/0084377 | A1 * | 4/2005 | Dambrine | | B29C 70/48 416/223 R |
| 2005/0249580 | A1 * | 11/2005 | Bourget | | F01D 21/045 415/9 |
| 2006/0254250 | A1 * | 11/2006 | Dambrine | | F01D 5/085 60/39.08 |
| 2006/0257260 | A1 * | 11/2006 | Dambrine | | B29C 70/48 416/230 |
| 2007/0007386 | A1 * | 1/2007 | Coupe | | B29C 70/24 244/102 A |
| 2007/0086896 | A1 * | 4/2007 | Aumont | | C22C 49/00 416/229 R |
| 2007/0092379 | A1 * | 4/2007 | Coupe | | B29B 11/16 416/241 R |
| 2008/0206048 | A1 * | 8/2008 | Coupe | | B29C 70/24 415/200 |
| 2010/0144227 | A1 * | 6/2010 | Coupe | | B29C 70/24 442/207 |
| 2011/0277869 | A1 * | 11/2011 | Coupe | | D03D 25/005 139/11 |
| 2012/0175047 | A1 * | 7/2012 | Dambrine | | B22F 3/15 156/189 |
| 2012/0267039 | A1 * | 10/2012 | Dambrine | | B29C 70/48 156/148 |
| 2013/0017094 | A1 * | 1/2013 | Coupe | | B29C 70/24 416/230 |
| 2013/0105031 | A1 * | 5/2013 | Dambrine | | B22F 3/15 139/383 R |
| 2013/0186507 | A1 * | 7/2013 | Godon | | B64C 11/26 139/425 R |
| 2013/0219717 | A1 * | 8/2013 | Dambrine | | B21D 53/78 29/889.7 |
| 2013/0259701 | A1 * | 10/2013 | Dambrine | | B22F 3/15 416/229 R |
| 2013/0270389 | A1 * | 10/2013 | Godon | | B29B 11/16 244/54 |
| 2013/0295302 | A1 * | 11/2013 | Godon | | D03D 3/00 428/34.1 |
| 2013/0312261 | A1 * | 11/2013 | Godon | | B21D 53/78 29/889.71 |
| 2013/0333793 | A1 * | 12/2013 | Dambrine | | D03D 11/00 139/408 |
| 2013/0340226 | A1 * | 12/2013 | Dambrine | | B22F 3/15 29/419.1 |
| 2013/0340241 | A1 * | 12/2013 | Godon | | B22F 3/15 29/527.6 |
| 2014/0064957 | A1 * | 3/2014 | Schneider | | F01D 21/045 415/214.1 |
| 2014/0068937 | A1 * | 3/2014 | Godon | | C22C 14/00 29/889 |
| 2014/0161626 | A1 * | 6/2014 | Podgorski | | C04B 35/64 416/96 R |
| 2014/0217652 | A1 * | 8/2014 | Varin | | B29C 70/462 264/571 |
| 2014/0334935 | A1 * | 11/2014 | Dambrine | | B29C 70/24 416/223 A |
| 2014/0369847 | A1 * | 12/2014 | Dambrine | | B29C 70/24 416/230 |
| 2015/0114511 | A1 * | 4/2015 | Dambrine | | D03C 3/38 139/86 |
| 2015/0167209 | A1 * | 6/2015 | Marchal | | F01D 9/02 416/230 |
| 2015/0239553 | A1 * | 8/2015 | Leclercq | | B64C 25/10 244/102 R |

* cited by examiner

MULTILAYER WOVEN FIBROUS STRUCTURE INCLUDING A HOLLOW TUBULAR PART, PRODUCTION METHOD THEREOF AND COMPOSITE PART COMPRISING SAME

BACKGROUND OF THE INVENTION

The invention relates to making a fiber structure by multilayer weaving, and more particularly a fiber structure including at least one hollow portion, in particular a portion that is tubular or substantially tubular.

The field of application is in particular that of making fiber structures for use in providing fiber preforms for composite material parts that are obtained by densifying fiber preforms with a matrix, or parts that are obtained by hot isostatic pressing or by forging and diffusion-welding preforms made of metallic fibers, and particularly, but not exclusively, parts for aviation turbine engines. Examples include:

- parts having at least one tubular portion secured to another portion such as a panel or a plate, the tubular portion being for enabling an element to be supported, guided, or hinged beside the panel; and
- parts such as hollow support arms or ducts that may optionally be partitioned longitudinally in order to form a plurality of passages.

Proposals have already been made to produce a fiber preform as a single piece from a multilayer woven structure in order to form a composite material part that is of complex shape.

The terms "multilayer weaving" or "three-dimensional weaving" are used herein to mean a weaving process between a plurality of layers of warp yarns and a set of weft yarns, at least some of the weft yarns interlinking warp yarns belonging to different layers of warp yarns. Several multilayer weaves can be used, such as interlock weaves, in which weft yarns in a given weft column move in the same manner in a plane of the weave, or else multi-satin, multi-plain, or multi-twill weaves. Reference may be made to Document WO 2006/136755.

It is known to make a multilayer woven structure that, on being shaped, makes it possible to obtain a preform having a shape that is close to the shape of a composite material part that is to be made. Reference may be made to Documents U.S. Pat. No. 7,241,112 and WO 2010/061139 that relate to making composite material blades for turbine engines.

OBJECT AND SUMMARY OF THE INVENTION

An object of the invention is to provide a method of making a structure that is woven as a single piece by multilayer weaving and that enables a fiber preform to be obtained for a composite material part having at least one hollow portion, in particular a portion that is tubular or substantially tubular, and that presents high mechanical strength.

In a first aspect of the method, the method comprises:

- weaving warp yarns of at least a first set of layers of warp yarns with weft yarns including at least some weft yarns that are taken over a distance that is greater than the width of the first set of layers of warp yarns measured in the weft direction in order to have weft yarn end portions available that extend beyond the zone of weaving;
- returning the end portions of said weft yarns so as to weave them with warp yarns by reinserting them in layers of warp yarns; and
- forming said hollow portion by looping the first woven set of layers of warp yarns back onto itself and applying traction to the ends of the reinserted weft yarns.

The free end portions of weft yarns may be reinserted in layers of warp yarns of a second set of layers of warp yarns, the first and second sets of layers of warp yarns being superposed and connected together over a fraction only of the width in the weft direction of the first set of warp yarns.

In a variant, the free end portions of weft yarns may be reinserted in layers of warp yarns of the first set of layers of warp yarns at locations that are offset in the warp direction relative to the locations of their initial insertion.

In a second aspect of the method, in order to provide a woven structure having a longitudinally partitioned hollow portion, the method comprises:

- weaving warp yarns of a first set of layers of warp yarns with weft yarns including at least some that are inserted in layers of warp yarns of the first set of layers of warp yarns while being taken over a distance that is greater than the length of the first set of layers of warp yarns measured in the weft direction in order to have weft yarn end portions available that extend beyond the zone of weaving;
- weaving warp yarns of a second set of layers of warp yarns with weft yarns including at least some that are inserted in layers of warp yarns of the second set of layers of warp yarns while being taken over a distance that is greater than the length of the second set of layers of warp yarns measured in the weft direction in order to have weft yarn end portions available that extend beyond the zone of weaving, the first and second sets of layers of warp yarns being arranged one above another and being interlinked over a fraction only of their width in the weft direction;
- returning said weft yarn end portions so as to weave them with warp yarns by reinserting them in layers of warp yarns; and
- forming said partitioned hollow portion by looping the first and second sets of layers of warp yarns back onto themselves and applying traction to the ends of the reinserted weft yarns.

Said end portions of weft yarn may be reinserted in layers of warp yarns of a third set of layers of warp yarns, the first, second, and third sets of warp yarns being superposed, and the first and second sets of layers of warp yarns being interlinked with the third set of layers of warp yarns over a fraction only of their width in the weft direction.

In a variant, said end portions of weft yarn may be reinserted in layers of warp yarns of the first and second sets of layers of warp yarns at locations that are offset in the warp direction relative to the locations of their initial insertion.

In any event, the hollow portion may be formed over a fraction only of the length of the woven structure in the warp direction.

Thus, the invention is remarkable in that, in at least a portion of the woven structure that is to form a hollow portion, a set of warp yarns is woven with weft yarns presenting extra length enabling them to be reinserted in the warp in order to weave them once more with warp yarns. As a result, this set of warp yarns can be looped back onto itself so as to form the hollow portion in which weft yarns extend continuously all around the hollow portion, thereby conferring strong mechanical properties to the hollow portion of the part that is obtained after the woven structure has been shaped and densified.

The invention also provides a woven fiber structure that is obtained as a single piece by multilayer weaving and comprising at least one hollow portion that is entirely defined by a multilayer woven wall made up of a plurality of layers of yarns interlinked by weaving throughout the thickness of the wall.

In an embodiment, the fiber structure comprises a hollow portion together with another portion that is adjacent to the hollow portion and interlinked therewith by weaving.

In an embodiment, the hollow portion is partitioned longitudinally.

The invention also provides a composite material part presenting at least one hollow portion, in particular a portion that is tubular or substantially tubular, the part comprising a fiber reinforcing structure as defined above or obtained by a method as defined above, the fiber reinforcing structure being densified by a matrix.

BRIEF DESCRIPTION OF THE DRAWINGS

The invention can be better understood on reading the following description made by way of non-limiting indication and with reference to the accompanying drawings, in which.

It should be observed that in FIGS. 2, 13, 19, and 25 the non-woven portions of the fiber structure are not shown.

DETAILED DESCRIPTION OF IMPLEMENTATIONS

Figure 1:
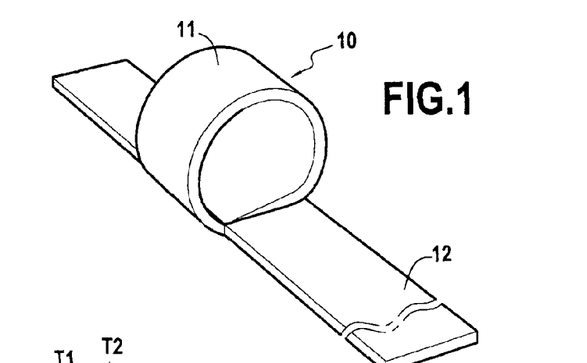
FIG. 1 is a diagrammatic perspective view of a first part made of composite material comprising fiber reinforcement densified by a matrix.

FIG. 1 shows a part 10 made of composite material having fiber reinforcement densified by a matrix. The part 10 comprises a tubular hollow portion 11 forming a ring secured to a plate 12, the tubular portion 11 being connected to the plate 12 over a portion of its periphery and over its entire length. By way of example, the part 10 may be used as a support or fastener part for an element inserted in the tubular portion 11, it being possible for the plate 12 to be fastened to a wall, e.g. by screws.

There follows a description of an embodiment of a fiber structure woven as a single piece by multilayer weaving so as to form, after shaping, a fiber preform suitable for constituting the fiber reinforcement of the part 10, the description being made with reference to FIGS. 2, 3, 4, 5A to 5D, and 6A to 6D.

Figure 2:
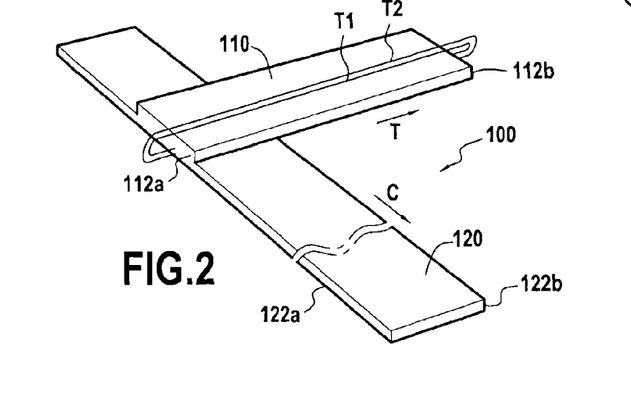
FIGS. 2 to 4 are very diagrammatic views showing successive steps in making a multilayer woven fiber structure for forming the fiber reinforcement of a part of the kind shown in FIG. 1, in a first implementation of the invention.

FIG. 2 shows the fiber structure 100 at the weaving stage, prior to shaping. The fiber structure 100 comprises a first woven portion 110 that is to form the portion of the fiber reinforcement that corresponds to the tubular portion 11 once it has been shaped by being looped onto itself, and a second woven portion 120 that is to form the portion of the fiber reinforcement that corresponds to the plate 12. FIGS. 5A to 5D show by way of example four successive weft planes in the portion 110, while FIGS. 6A to 6D show by way of example four successive weft planes in the portion 120.

The weaving is performed with a first set 112 of warp yarn layers C1, C2, C3 for the portion 110 and a second set 122 of warp yarn layers C4, C5, C6 for the second portion 120. In the portion 110, the warp yarn layers extend in the weft direction (arrow T) over a distance corresponding substantially to the developed length of a circumference of the tubular portion 11. In the portion 120, the warp yarn layers extend in the weft direction over a distance corresponding substantially to the width of the plate 12. The set of layers of warp yarns 112 and 122 are placed one above the other.

Two respective first edges 112a and 122a of the portions 110 and 120 extending in the warp direction (arrow C) are situated substantially in the same plane, whereas the opposite second edge 122b of the portion 110 is situated beyond the opposite second edge 122b of the portion 120.

For reasons of clarity, FIG. 2 shows only the envelopes of the woven portions 110 and 120, as mentioned above. In particular, the non-woven warp yarns of the first set 112 of layers of warp yarns are not shown, the woven portion 110 extending in the warp direction over a distance that is substantially equal to the longitudinal dimension of the tubular portion 11, which distance is less than the length of the plate 12 in the example shown.

As shown in FIGS. 5A to 5D, weaving is performed in the portion 110 with an interlock type weave, the layers of warp yarns being interlinked in each weft plane by weft yarns T1, T2 in a common column of weft yarns. The weft yarns T1, T2 are inserted with excess length so as to present end portions that extend beyond the weaving zone, i.e. beyond the edge 112b. These end portions are of sufficient length to be capable of being returned to beside the edge 122a and of being reinserted into layers of warp yarns in order to be woven with warp yarns. Thus, the weft yarn T1, after interlinking the warp yarns of the layers C1 and C2 is reused to interlink the warp yarns of the layer C4 in the set 122 with the warp yarns of the layer C3 of the set 112, thereby connecting together the portions 110 and 120. After interlinking the warp yarns of the layers C2 and C3, the weft yarn T2 is reused to interlink the warp yarns of the layers C4 and C5. In FIG. 2, the return of the end portions of the weft yarns initially woven with excess length is shown only for two yarns T1 and T2 in a single weft plane.

As shown in FIGS. 6A to 6D, the weaving in the portion 120 is performed with the same interlock weave, for example, the layers of warp yarns being interlinked in each weft plane by weft yarns T3, T4. Each yarn T3 interlinks warp yarns of the layers C4 and C5, whereas each yarn T4 interlinks warp yarns of the layers C5 and C6.

In FIGS. 5A to 5D, there can be seen the weft yarn T4 interlinking warp yarns of the layers C5 and C6.

The planes of FIGS. 5A to 5D can be deduced from one another by moving in translation in the weft direction through a distance corresponding to one pitch step between the columns of warp yarns. The same applies to the planes shown in FIGS. 6A to 6D.

Naturally, the number of layers of warp yarns in the sets 110 and 120 may be other than three, the number of layers of weft yarns being adapted accordingly.

Furthermore, different interlock weave patterns may be adopted for the portions 110 and 120, and/or within those portions themselves.

It should also be observed that only some of the weft yarns interlinking warp yarns in the portion 110 need be woven with extra length in order to be reinserted into the warp, while other weft yarns may be woven conventionally over no more than the width of the portion 110 so that they are not reinserted into the portion 120. It is also possible to vary the number of warp yarns per column of warp yarns in the portion 110 in order to increase thickness locally.

Figures 3, 4:
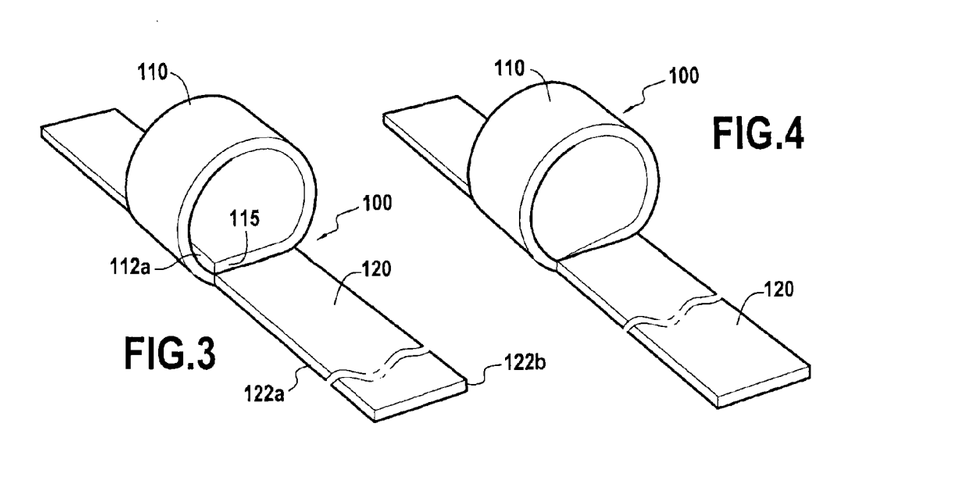
Figure 5A:
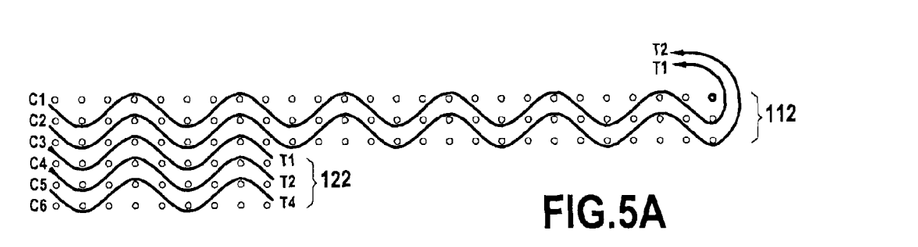
FIGS. 5A to 5D are successive weft planes in a portion of the fiber structure at the step of FIG. 2.
Figure 5B:
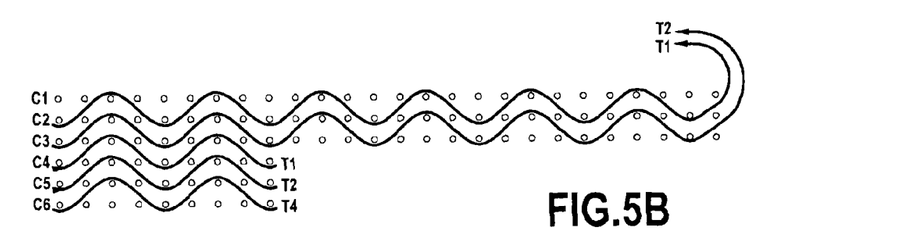
Figure 5C:
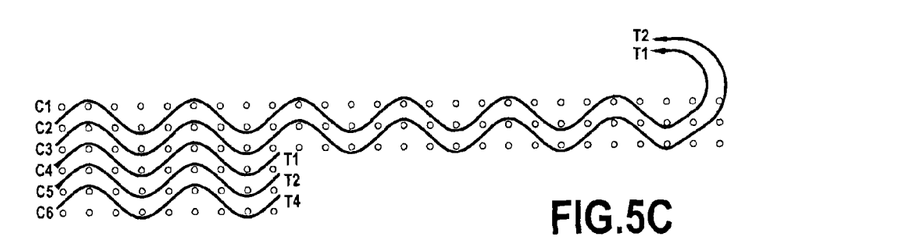
Figure 5D:
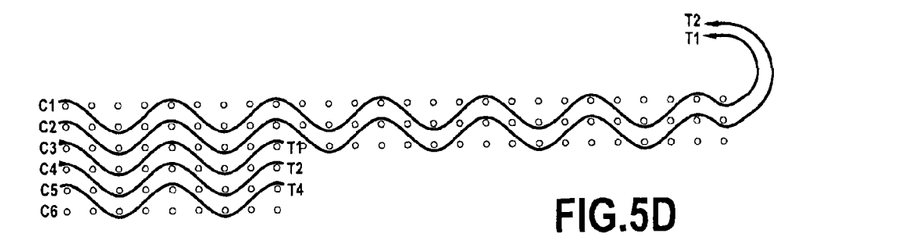
Figure 6A:
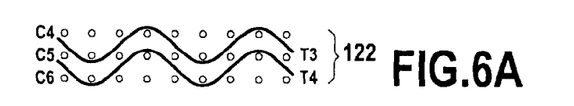
FIGS. 6A to 6D are successive weft planes in another portion of the fiber structure at the step of FIG. 2.
Figure 6B:
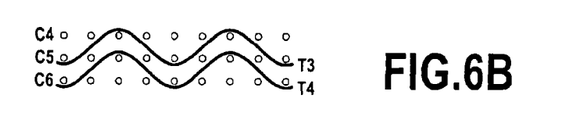
Figure 6C:
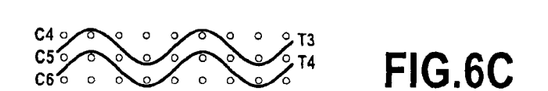
Figure 6D:
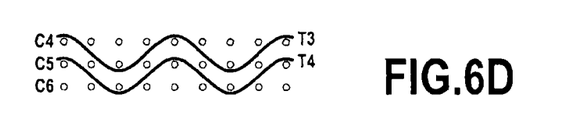

After weaving, with the non-woven portions of the yarns being removed, the woven structure 100 is shaped as shown in FIG. 3 by looping the portion 110 onto itself while exerting traction on the ends of the reinserted weft yarns T1, T2. The portion 110 may be shaped by rolling it up on a core. This obtains a hollow portion that is completely defined by a multilayer woven wall comprising a plurality of layers of yarns interlinked by weaving throughout the thickness of the wall.

In the tubular portion formed by looping the portion 110, the edge 112a forms a step 115. This may be eliminated by removing a few warp yarns and by cutting off the portions of weft yarns that are then left non-woven so that the inside face of the tubular portion formed by looping the portion 110 runs smoothly to a level corresponding to the top face of the portion 120 (FIG. 4). In a variant, instead of removing the warp yarns after weaving, it would be possible to form the set of layers of warp yarns for the portion 110 with a number of layers that increases progressively from the edge 112a and over a distance in the weft direction that corresponds to the width of the set 120. This technique for varying thickness may be applied at any location in the portions 110 and 120, if so desired.

Figure 7:
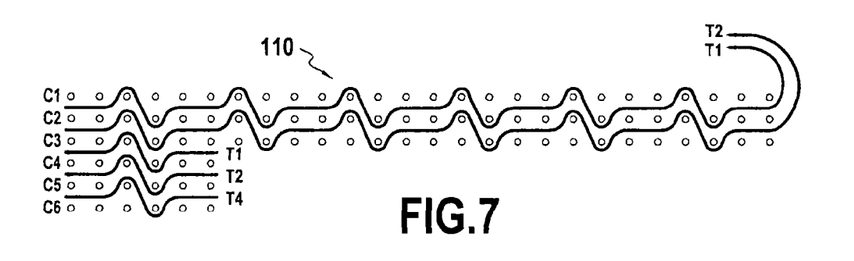
FIG. 7 shows a variant weave.

FIG. 7 shows, by way of example, a weft plane in which the portion 110 of the fiber structure has a multi-satin type weave different from the interlock weave of FIGS. 5A-5D and 6A-6D.

In the above-described implementation, the weft yarns initially woven with extra length are reinserted into the warp in the same weft plane as they were initially inserted. In a variant, this reinsertion of weft yarns initially woven with extra length could be performed in a different following weft plane, one that is not necessarily immediately adjacent to the weft plane corresponding to their initial insertion.

During weaving, the end portions of the weft yarns woven with extra length may be returned, e.g. manually, to the weft yarn feed side in order subsequently to be reinserted and woven like the other weft yarns. The weaving is performed by means of a loom of the Jacquard type that is adapted to multilayer weaving, where such a loom is itself well known.

Depending on the intended application, the part in which the multilayer woven structure forms the fiber reinforcement may be made of a composite material of the fiber and organic polymer type or it may be made of thermostructural composite material.

With the first type of material, the fibers of the woven structure may in particular be fibers of carbon, of glass, of aramid, or of ceramic, while the matrix may be an organic resin, e.g. an epoxy, bismaleimide or polyimide polymer. A matrix-precursor resin may be impregnated immediately after weaving (at the step of FIG. 2) prior to shaping the woven structure, with the pre-impregnated woven structure then being shaped by rolling the portion 110 around a core and being held in the desired shape by means of mold-forming tooling while the resin is polymerized. In a variant, the dry woven structure may be shaped by rolling the portion 110 around a core and it may then be held in the desired shape by means of mold-forming tooling into which the resin is injected by a method of the resin transfer molding (RTM) type. Both of those processes are well known.

With a composite material of the thermostructural type, the fibers of the woven structure may be made of carbon or of ceramic, while the matrix may be made of carbon or of ceramic. For parts that are to be used in hot portions of an aviation turbine engine, it is preferable to select a ceramic matrix composite (CMC) material. It is well known how to make parts of complex shape out of thermostructural material. A first step of consolidation by a first matrix phase may be performed using a resin that is a precursor of the consolidating matrix of carbon or of ceramic. Impregnation may be performed immediately after weaving (at the step of FIG. 2), and prior to shaping, or it may be performed after shaping, the woven structure then being held in shape in tooling. After the resin has been polymerized and pyrolyzed, a consolidated woven structure is obtained that conserves its shape without requiring supporting tooling. Densification can then be continued using a liquid technique (impregnation with a carbon or ceramic precursor resin, polymerization, and pyrolysis), or by a chemical vapor infiltration (CVI) technique. It is also possible for a fiber/matrix interphase coating to be formed beforehand. Reference may be in particular to documents US 2010/015428 and WO 2010/061139.

It is also possible to make a part from a woven structure made of metal or metal alloy tows and/or wires, e.g. made of titanium or titanium alloy, or to use composite yarns comprising a central core that is ceramic, e.g. made of fibers based on silicon carbide SiC, and coated in metal or metal alloy, e.g. in titanium or titanium alloy, or in boron.

In a woven structure made of metal tows and/or wires or made of yarns coated in a metallic material, the making of the part may include an initial hot isostatic pressing (HIP) step or an initial step of isothermal forging under vacuum. Applying heat associated with pressure eliminates the empty spaces within the woven structure by plastic deformation and creep of the metal of the wires or of the coating of the yarns. The part is finally formed by diffusion welding under vacuum, where such a process combining HIP or isothermal vacuum forging with diffusion welding under a vacuum applied to a woven texture made of metal wires or of metal-coated yarns is itself known.

In the above-described implementation, a multilayer woven structure is made in order to fabricate a part that presents a plate secured to a hollow tubular portion extending over a fraction only of the length of the plate.

Figures 8, 9:
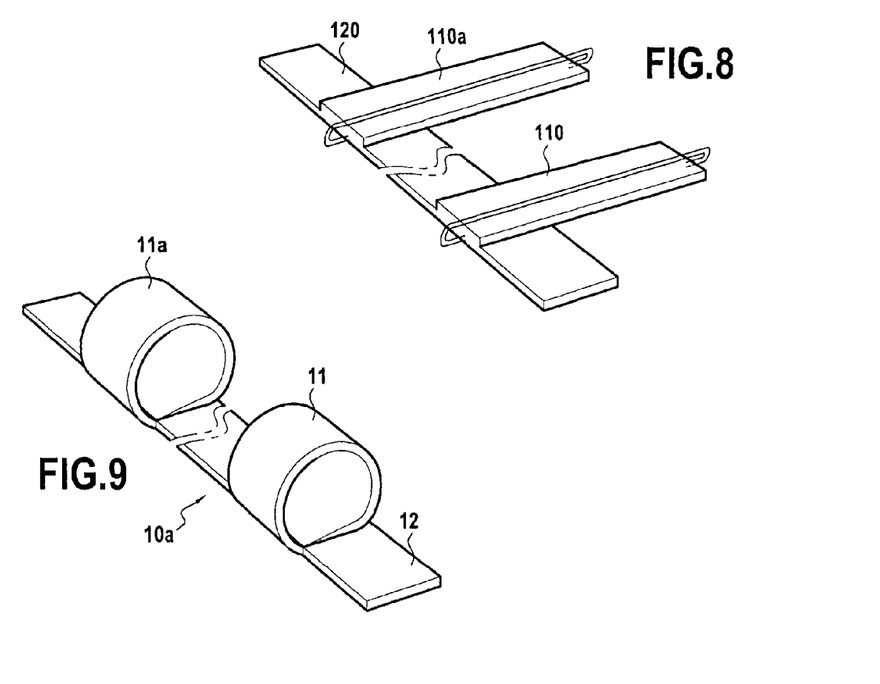
FIGS. 8 and 9 are diagrammatic perspective views of a multilayer woven fiber structure and of a corresponding part made of composite material in a variant of the first implementation.

FIG. 8 shows a multilayer woven fiber structure at a weaving stage that differs from that of FIG. 2 in that it has a woven portion 110a in addition to the portion 110 and similar thereto, the woven portions 110 and 110a being spaced apart from each other along the portion 120. After the portions 110 and 110a have been looped onto themselves, a fiber preform is obtained for a part of the kind 10a shown in FIG. 9 that presents a plate 12 secured to two tubular hollow portions 11 and 11a that are spaced apart from each other, and that are in alignment, for example. Naturally, it is also possible to form more than two hollow portions which are tubular and/or have shapes that might be different.

Figure 10:
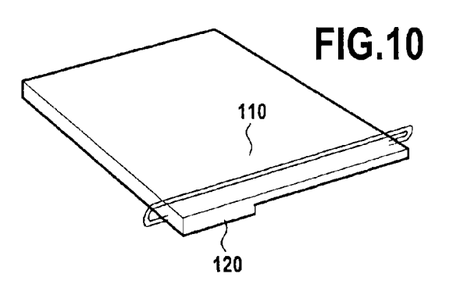
FIGS. 10 and 11 are diagrammatic perspective views of a multilayer woven fiber structure and of a corresponding composite material part in another variant of the first implementation.
Figure 11:
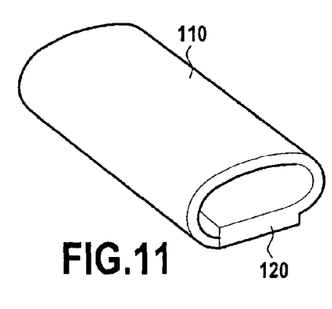

FIG. 10 shows a multilayer woven fiber structure at the weaving stage that differs from that of FIG. 2 in that the portions 110 and 120 extend in the warp direction over the same length. After the portion 110 has been looped onto itself, a fiber preform is obtained (FIG. 11) that presents an essentially tubular hollow shape that is entirely defined by a multilayer woven wall having a plurality of layers of yarns interlinked by weaving throughout the thickness of the wall. Such a preform may for example be used to form a hollow arm of an intermediate casing in an aviation turbine engine.

Figures 12, 13:
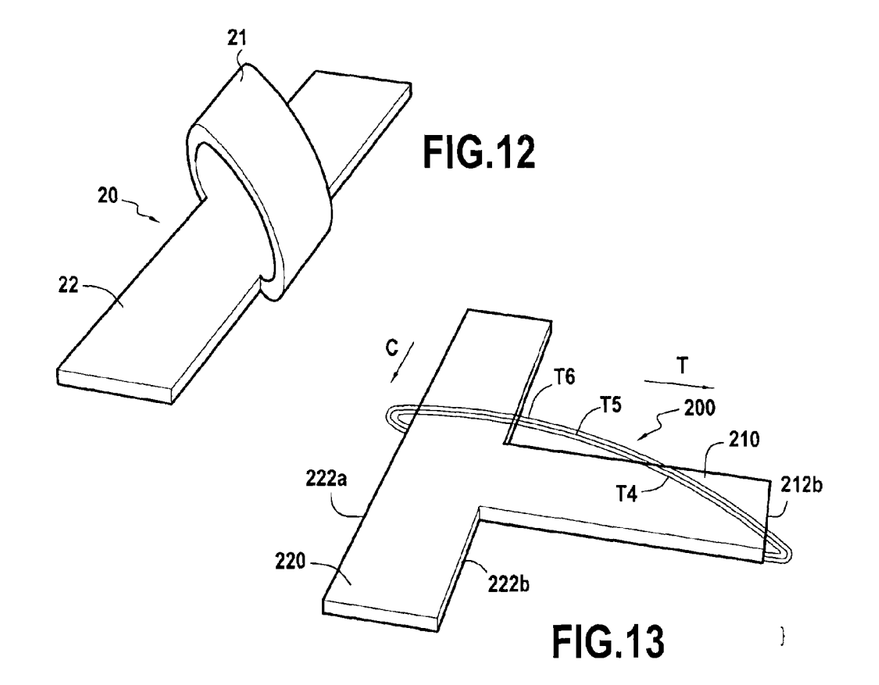
FIG. 12 is a diagrammatic perspective view of a second part made of composite material comprising fiber reinforcement densified by a matrix.
FIG. 13 is a highly diagrammatic view showing a step in making a multilayer woven fiber structure for forming the fiber reinforcement of a part of the kind shown in FIG. 12, in a second implementation.

FIG. 12 shows another part 20 comprising a hollow tubular portion forming a ring 21 secured to a plate 22 and suitable for being used for the same purposes as the part 10 of FIG. 1, for example. It should be observed that the end faces of the tubular portion 12 are not perpendicular to the longitudinal direction of the portion 22.

An embodiment of a fiber texture woven as a single piece by multilayer weaving and, after shaping, forming a fiber preform for the part 20 is described below with reference to FIGS. 13 to 16.

FIG. 13 shows the fiber structure 200 at the weaving stage, prior to shaping. The fiber structure 200 comprises two woven portions 210 and 220. The portion 220 is to form the portion of the fiber preform that corresponds to the plate 22 and it presents opposite longitudinal edges 222a and 222b in the warp direction (arrow C). The portion 210 extends in the weft direction (arrow T) from edge 222a to an opposite edge 212b over a distance that makes it possible, after being looped, to co-operate with a segment of the portion 220 to form the portion of the fiber preform that corresponds to the annular portion 21. In the warp direction, the portion 210 extends over a distance that is shorter in comparison with the portion 220. FIG. 13 shows only the envelopes of the woven portions 210 and 220.

Figures 14, 15:
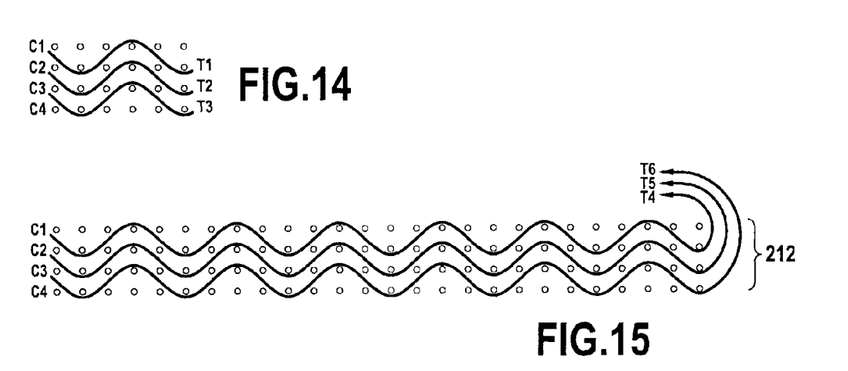
FIGS. 14, 15, and 16 show weft planes in different portions of the fiber structure at the step of FIG. 13.

FIG. 14 shows a weft plane in the portion 220, in front of the location of the portion 210. Weaving is performed with a set 212 of layers of warp yarns C1 to C4 that are interlinked by weft yarns T1, T2, and T3 in a given column of weft yarns, the weave being of the interlock type, for example.

FIG. 15 shows a weft plane in the portion 210. Over the total distance in the weft direction of the touching portions 210 and 220, weaving is performed, e.g. using weft yarns T4, T5, and T6 interlinking the warp yarns of the layers C2 to C4 with the same interlock weave as that shown in FIG. 14. The yarns T4, T5, and T6 are woven with extra length so as to present end portions that extend beyond the weaving zone. These end portions are of sufficient length to be capable of being returned to beside the edge 222a and of being reinserted into the warp in order to be woven with warp yarns.

Figure 16:
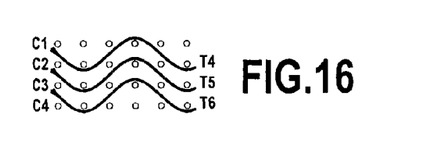

The free end portions of the weft yarns woven with extra length are reinserted into the layers of warp yarns C1 to C4 of the set 212 at respective locations that are offset rearwards in the warp direction. As shown in FIG. 13, the end portions of the weft yarns of the first weft plane of the woven portion 210 are reinserted into the layers of warp yarns, e.g. to form a first weft plane of the portion 220 following the last weft plane in the portion 210. The procedure is repeated in similar manner for the weft yarns (not shown in FIG. 13) of all of the other weft planes of the portion 210. FIG. 16 shows such a weft plane in the portion 210 with warp yarns interwoven with the end portions of the weft yarns T4, T5, and T6 of FIG. 15. In this example, the offset in the warp direction of the end portions of the weft yarns that are reinserted is implemented over a distance that corresponds to the dimension of the portion 210 in the warp direction. As a function in particular of the ability of the portion 210 to deform while it is being looped over, this offset may be made over some other distance, e.g. a shorter distance. In the latter case, the first weft yarns woven with extra length in the portion 210 are reinserted into this same portion, and the extra lengths are determined accordingly.

Naturally, the number of layers of warp yarns in the portions 210 and 220 may be other than four, with the number of layers of weft yarns being adapted accordingly.

After weaving, the non-woven portions of the yarns are removed and the woven structure 200 is shaped by looping the portion 210 so as to bring its edge 212b against the edge 222a of the portion 220 while applying traction on the ends of the reinserted weft yarns. This produces a fiber preform having a shape close to that of the part 20 and having a hollow portion that is defined entirely by a multilayer woven wall comprising a plurality of layers of yarns that are interlinked by weaving throughout the thickness of the wall. The shaping of the fiber structure 200 by means of tooling in order to obtain a fiber preform for the part 20, and the treatment of the fiber preform in order to obtain the desired part may be performed in the same manner as that described above for the first implementation.

In the implementation of FIG. 13, the end portions of the weft yarns that are woven with extra length in the portion 210 are reinserted into the layers of warp yarns at locations that are offset rearwards in the warp direction.

In a variant, this reinsertion may be performed at locations that are offset forwards in the warp direction.

Figure 17:
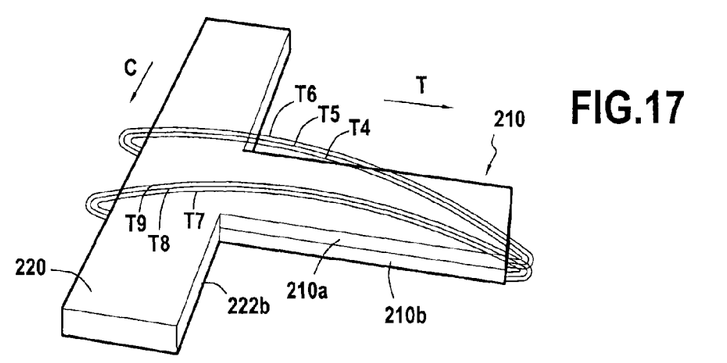
FIG. 17 is a highly diagrammatic view of a step in making a multilayer woven fiber structure in a variant of the second implementation.

Still in a variant, and as shown in FIG. 17, the portion 210 may be made up of two superposed woven subportions 210a and 210b that are not linked together. The weft yarns T4, T5, and T6 interlinking layers of warp yarns in the portion 210a and woven with extra length have their ends reinserted into layers of warp yarns at locations that are offset rearwards in the warp direction. The weft yarns T7, T8, and T9 initially situated in the same plane as the yarns T4, T5, and T6, interlinking layers of warp yarns in the portion 210b and woven with extra length, have their ends reinserted into layers of warp yarns at locations that are offset forwards in the warp direction. After weaving, the subportions 210a and 210b are bent over so as to form two loops diverging from each other in the warp direction from a common origin along the edge 222b of the portion 220.

Figure 18:
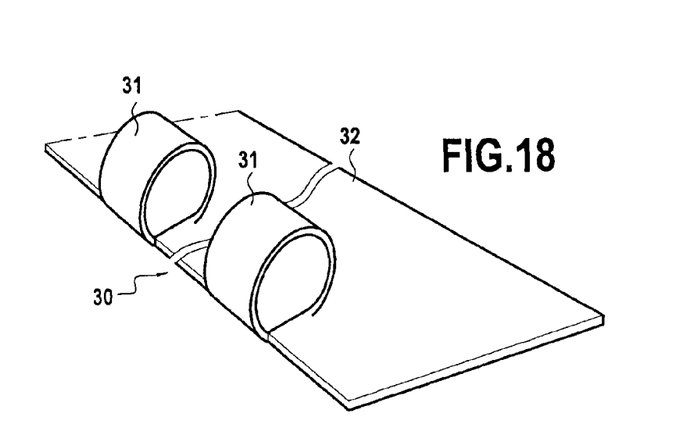
FIG. 18 is a diagrammatic perspective view of a third part made of composite material comprising fiber reinforcement densified by a matrix.

FIG. 18 shows yet another part 30 having two tubular hollow portions 31 forming two rings secured to a panel 32 in the vicinity of an edge thereof, the tubular portions being spaced part from each other and having substantially a same axis. The part 30 may be used for example as a door or a cap that pivots about a pin engaged in the tubular portions 31.

An embodiment of a fiber structure woven as a single piece by multilayer weaving and that serves, after shaping, to form a fiber preform for the part 30 is described below with reference to FIGS. 19, 20, 21, 22, and 23.

Figure 19:
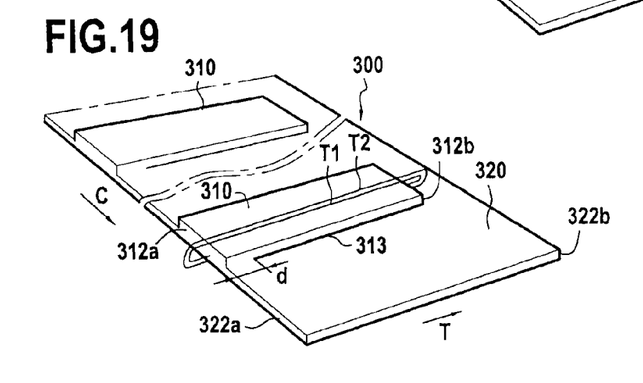
FIGS. 19, 20, and 21 are highly diagrammatic views of successive steps in making a multilayer woven fiber structure for forming the fiber reinforcement of a part of the kind shown in FIG. 18 in a third implementation.

FIG. 19 shows the fiber structure 300 at the weaving stage, before shaping. The fiber structure 300 has two first woven portions 310 that, after shaping by being looped back onto themselves, are to form the portions of the fiber reinforcement that correspond to the tubular portions 31, and a second woven portion 320 that is to form the portion of the fiber reinforcement that corresponds to the panel 32. In FIG. 19, only the envelopes of the woven portions are shown for greater clarity. The portion 320 presents two opposite longitudinal edges 322a and 322b in the warp direction (arrow C). Each portion 310 is superposed on the portion 320 and presents longitudinal edges 312a, 312b. The edges 312a substantially coincide with the edge 322a, while the edges 312b are set back from the edge 322b, the portions 310 extending in the weft direction (arrow T) over a distance that corresponds to the developed length of a circumference of a tubular portion 31, this distance in the example shown being less than the size of the portion 320. It should also be observed that each portion 310 is connected to the portion 320 over only a fraction d of its size in the weft direction from the edges 312a, 322a, such that a non-interlinked zone 313 is arranged between each portion 310 and the portion 320.

Figure 22:
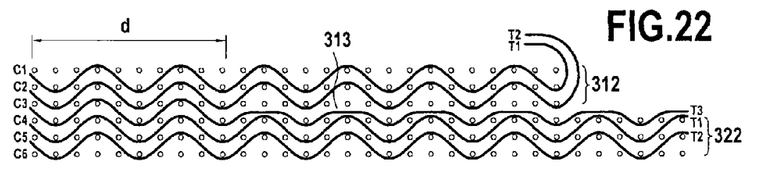
FIGS. 22 and 23 show weft planes in two different portions of the fiber structure at the step of FIG. 19.

FIG. 22 shows a weft plane in the woven structure 300 where a portion 310 is superposed on the portion 320. The weaving is performed with a first set 312 of layers of warp yarns C1 to C3 for the portion 310 and a second set 322 of layers of warp yarns C4 to C6 for the portion 320. A weft yarn T1 interlinks the warp yarns of the layers C1 and C2, while a weft yarn T2 interlinks the warp yarns of the layers C2 and C3. A weft yarn T3 interlinks warp yarns of the layers C3 and C4 over the distance d only so as to leave the non-interlinked zone 313.

The weft yarns T1 and T2 are inserted with extra length so as to present end portions that extend beyond the weaving zone, i.e. beyond the edge 312b. These end portions are of a length that is sufficient to enable them to be returned to side of the edge 322a and to be reinserted in the warp in order to be woven with warp yarns. Thus, the weft yarn T1, after interlinking warp yarns of the layers C1 and C2 is reused to interlink warp yarns of the layers C4 and C5 of the second set 322 of layers of warp yarns. Similarly, after interlinking warp yarns of the layers C2 and C3, the weft yarn T2 is reused for interlinking warp yarns of the layers C5 and C6 of the second set 322 of layers of warp yarns. Only one weft plane is shown, the others being deduced therefrom by offsetting through one pitch step between columns of warp yarns. In FIG. 19, the return of only two weft yarns T1 and T2 is shown.

Figure 23:
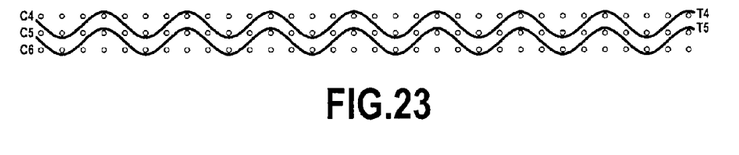

FIG. 23 shows a weft plane in the portion 320 of the woven structure outside its superposition with the portion 310. A weft yarn T4 interlinks warp yarns of the layers C4 and C5, while a weft yarn T5 interlinks warp yarns of the layers C5 and C6 in the same manner as the reinserted portions of the yarns T1 and T2 in FIG. 22. A single weft plane is shown, the others being deduced therefrom by offsetting to one pitch step between columns of warp yarns.

In the example shown in FIGS. 22 and 23, the weaving is performed with an interlock weave. Other weaves could naturally be used. The weaves may differ between firstly the portions 310 and secondly the portions 320, and they may also differ between the portions 310. In addition, the number of layers of warp yarns in the portions 310 and 320 may naturally be other than three, the number of layers of weft yarns being adapted accordingly. In the portion 310, it should also be observed that only some of the weft yarns need be woven initially with extra length.

Figure 20:
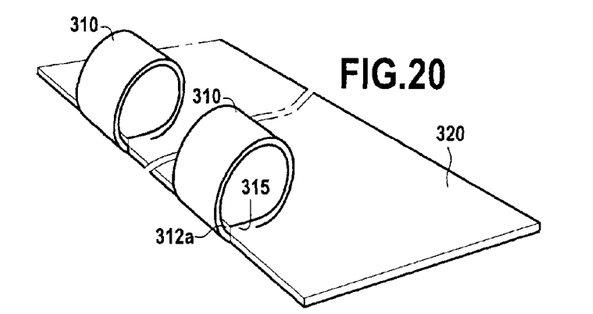
Figure 21:
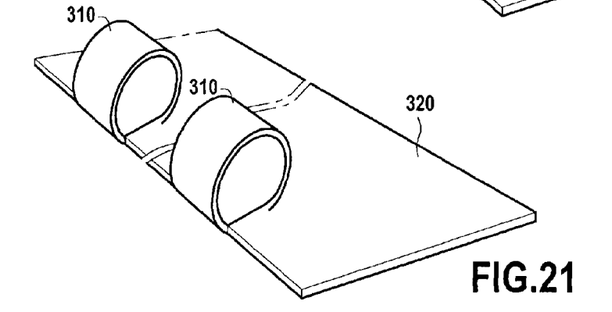

After weaving, the non-woven portions of the yarns are removed and the woven structure can be shaped as shown in FIG. 20 by looping the portions 310 onto themselves while exerting traction on the ends of the reinserted weft yarns T1 and T2. This produces hollow portions, each of which is completely defined by a multilayer woven wall having a plurality of layers of yarns interlinked by weaving throughout the thickness of the wall. In the tubular portions formed by looping back the portion 310, the edges 312a form steps 315. These may be eliminated or avoided in the same manner as that described above with reference to FIGS. 3 and 4 so as to end up with a fiber preform of the kind shown in FIG. 21.

The shaping of the fiber structure 300 by means of tooling in order to obtain a fiber preform for the part 30 and the treatment of that preform in order to obtain the desired part may be performed in the manner described above for the first implementation.

Figure 24:
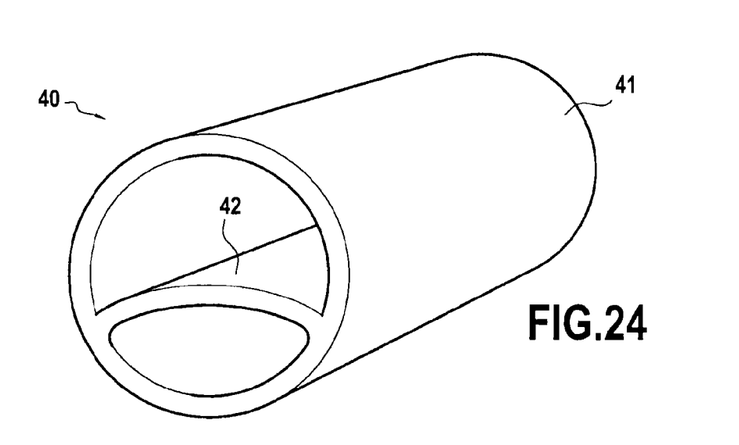
FIG. 24 is a diagrammatic perspective view of a fourth part made of composite material comprising fiber reinforcement densified by a matrix.

FIG. 24 also shows another part 40 having a hollow portion 41 of substantially tubular shape with a partition 42 subdividing the inside volume of the hollow portion 41 over its entire length. Such a partitioned hollow part may be used for example as an intermediate casing arm in an aviation turbine engine that presents two separate ducts for passing different functions, e.g. a radial shaft transmitting mechanical power to an accessory gearbox (AGB) on one side of the partition 42, and an electrical connection on the other side, or indeed tubes for conveying fluid. The partition 42 may also serve merely to stiffen the part 40.

There follows a description of an embodiment of a fiber structure woven as a single piece by multilayer weaving that, after shaping, forms a fiber preform for the part 40, the description being given with reference to FIGS. 25, 26, 27, and 28A to 28D.

Figure 25:
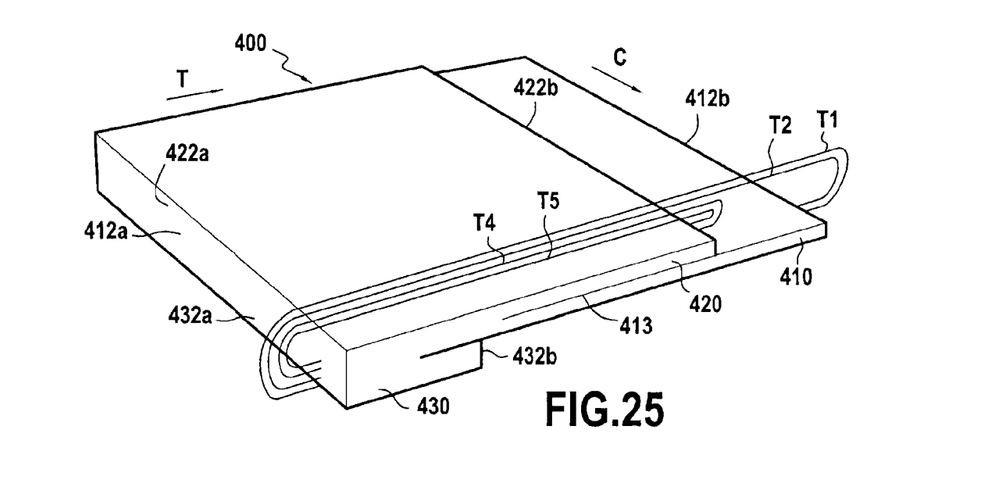
FIGS. 25, 26, and 27 are highly diagrammatic views of successive steps in making a multilayer woven fiber structure to form the fiber reinforcement of a part of the kind shown in FIG. 24, in a fourth implementation.

FIG. 25 shows the fiber structure 400 at the weaving stage, prior to shaping. The fiber structure 400 comprises a first woven portion 410 that, after being shaped by being looped back onto itself, is to form a major fraction of the portion of the fiber reinforcement that corresponds to the tubular portion 41, a second woven portion 420 that, after shaping by being looped back onto itself, is to form the portion of the fiber reinforcement that corresponds to the partition 42, and a third woven portion 430.

By way of example, FIGS. 28A to 28D show four successive weft planes in the woven structure 400.

Weaving is performed with a first set 412 of layers of warp yarns C5, C6, C7 for the portion 410, a second set 422 of layers of warp yarns C8, C9, C10 for the portion 420, and a third set 432 of warp yarns C1, C2, C3, C4 for the portion 430. In the portion 410, the layers of warp yarns extend in a weft direction (arrow T) over a width corresponding substantially to the developed length of a circumference of the tubular portion 11. In the portion 420, the layers of warp yarns extend in the weft direction over a width that is less than the width of the portion 410 but that is sufficient, after looping, to form the portion of the fiber reinforcement that corresponds to the partition 42. In the portion 430, the layers of warp yarns extend in the weft direction over an even smaller width. The sets of layers of warp yarns 430, 410, and 420 are arranged one above another in that order and, in the warp direction (arrow C), they present respective longitudinal edges 432a, 412a, 422a that are situated substantially in the same plane on the weft yarn feed side. In the warp direction, the woven portions 410, 420, 430 extend over the same length. The woven portion 410 is connected to the woven portion 430 over its entire width, while the woven portion 420 is connected to the woven portion 420 over a fraction only of its width starting from the edge 422a, thereby leaving a non-interlinked zone 413 between the portions 410 and 420. The distance in the weft direction over which the portions 410 and 420 are connected together may for example be substantially equal to or slightly greater than the width of the portion 430. In FIG. 25, and for reasons of clarity, only the envelopes of the woven portions 410, 420, and 430 are shown.

As shown in FIGS. 28A to 28D, in a given weft column, weft yarns T1, T2 interlink warp yarns of the layers of warp yarns C5, C6, C7, while a weft yarn T3 interlinks warp yarns of the layers of warp yarns C7 and C8, and weft yarns T4, T5 interlink warp yarns of the layers of warp yarns C8, C9, and C10.

The weft yarns T1 and T2 are inserted with extra lengths so as to present end portions that extend beyond the weaving zone, i.e. beyond the longitudinal edge 412b of the woven portion 410 remote from the edge 412a. These end portions are of a length that is sufficient to enable them to be brought back to beside the edge 432a and to be reinserted into the layers of warp yarns in the portion 430. Thus, the weft yarn T1, after interlinking warp yarns of the layers C5 and C6 is reused to interlink warp yarns of the layers C1 and C2, while the weft yarn T2, after interlinking warp yarns of the layers C6 and C7 is reused to interlink warp yarns of the layers C2 and C3.

The weft yarn T3 interlinks warp yarns of the layers C7 and C8 over a limited distance from the edges 412a, 422a so as to leave the non-interlinked zone 413 between the woven portions 410 and 420.

The weft yarns T4 and T5 are inserted with extra length so as to present end portions that extend beyond the weaving zone, i.e. beyond the longitudinal edge 422b of the woven portion 420 remote from the edge 422a. These end portions are of a length that is sufficient to enable them to be brought back to beside the edge 432a and to be reinserted into layers of warp yarns in the portion 430. Thus, the warp yarn T4, after interlinking warp yarns of the layers C8 and C9 is reused to interlink warp yarns of the layer C3 and C4, while the weft yarn T5, after interlinking warp yarns of the layers C9 and C10 is reused to interlink warp yarns of the layers C4 and C5.

The return of the end portions of the weft yarns initially woven with extra lengths is shown in FIG. 25 only for the weft warps T1, T2, T4, and T5 in a single weft plane.

The weft planes of FIGS. 28A to 28D can be deduced from one another by offsetting through one pitch step between columns of warp yarns.

These figures show an interlock type weave. Other types of weave could naturally be used. The weaves of the portions 410, 420, and 430 are not necessarily the same. It is also possible to vary the weave within a given portion 410, 420, or 430. Furthermore, the numbers of layers of warp yarns in the portions 410, 420, and 430 may be other than three, three, and four, respectively, the numbers of layers of weft yarns being adapted accordingly. It should also be observed that only some of the weft yarns interlinking warp yarns in the portions 410 and 420 need be woven with extra length.

Figures 26, 27:
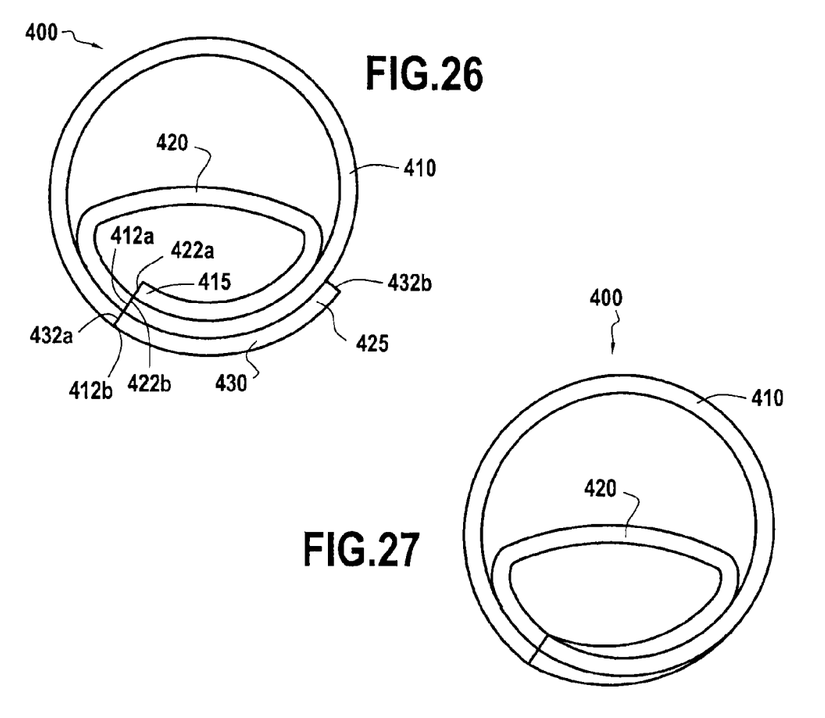
Figure 28A:
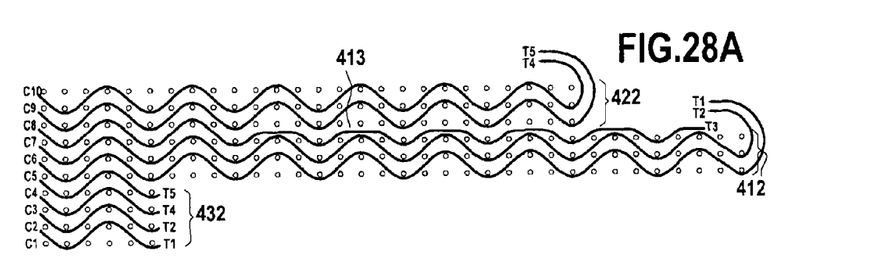
FIGS. 28A to 28D show successive weft planes in the fiber structure at the step of FIG. 25.
Figure 28B:
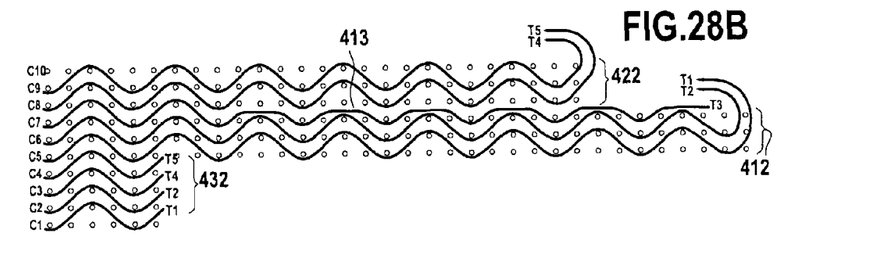
Figure 28C:
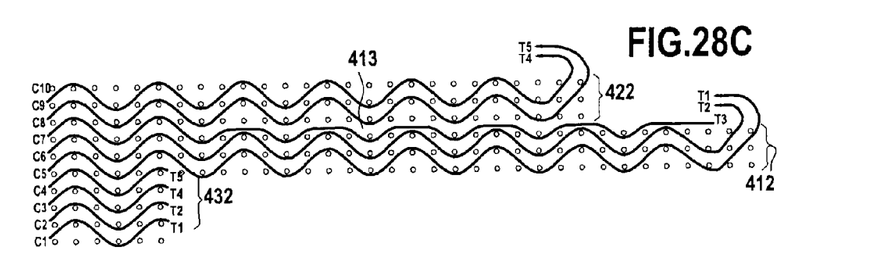
Figure 28D:
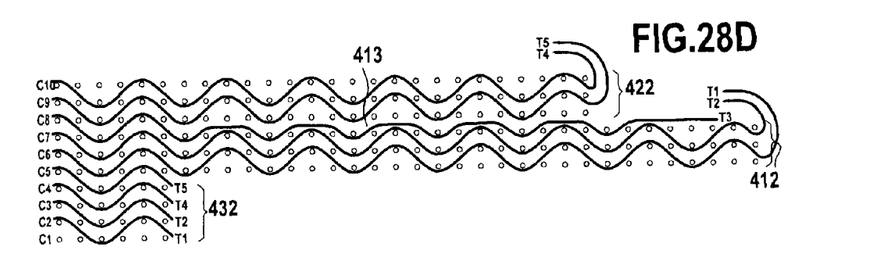

After weaving, the non-woven portions of the yarns are removed, and the woven structure 400 is shaped as shown in FIG. 26 (end view) by looping back onto themselves the woven portions 410, 420 with traction being exerted on the ends of the reinserted weft yarns T1, T2, T4, and T5. This produces a partitioned hollow portion that is defined entirely by a multilayer woven wall made up of a plurality of layers of yarns interlinked by weaving throughout the thickness of the wall. Shaping may be performed by rolling the portions 410 and 420 around cores.

In the tubular portions formed by looping back the portions 410 and 420, the edges 412a and 432b form steps 415 and 425. These may be eliminated in a manner similar to that described above for the first implementation (FIGS. 3 and 4) in order to obtain the shape shown in FIG. 27 (end view).

Shaping by means of tooling in order to obtain a fiber preform for the part 40, and processing of the preform in order to obtain the desired part may be performed as described above for the first implementation.

In the implementation of FIGS. 24-27 and 28A-28D, the weft yarns woven with extra length in the portions 410 and 420 are reinserted into the portion 430 in the same weft plane. In a variant, the end portions of the weft yarns of a given weft plane woven with extra length in the portion 410 may be reinserted in a following weft plane in order to be woven with warp yarns of the same portion 410. In similar manner, the end portions of the weft yarns of a given weft plane woven with extra length in the portion 420 may be reinserted into a following weft plane in order to be woven with warp yarns of the same portion 420.

Naturally, in applying a weaving principle similar to that described above, it is possible to make a multiply-partitioned hollow part, i.e. a part having a plurality of longitudinal partitions subdividing its inside volume.

In addition, in the part, the partition or at least one of the partitions when there are two or more partitions, may extend over a length that is less than the length of the hollow portion, the portion of the fiber structure corresponding to the or each partition of reduced length, such as the portion 420 in FIG. 25, then being woven over a shorter distance in the warp direction compared with the other portions of the fiber structure.

Figure 29:
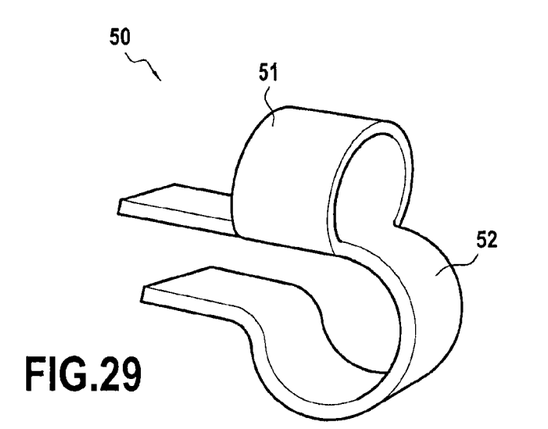
FIG. 29 is a diagrammatic perspective view of a fifth part made of composite material comprising fiber reinforcement densified by a matrix.

FIG. 29 shows yet another part 50 that can be obtained from a structure woven as a single piece by multilayer weaving in accordance with the invention. The part 50 comprises a tubular hollow portion 51 secured to another portion 52 that is curved about an axis other than the axis of the portion 51, e.g. that is perpendicular thereto. By way of example, such a part may be used as a bellcrank. To obtain the part 50, it is possible to use a woven structure such as the structure 100 of FIG. 2, the portion of the fiber preform corresponding to the hollow portion 51 being obtained by looping back onto itself the portion 110 of the fiber structure 100, and the portion of the fiber preform corresponding to the portion 52 being obtained by curving the portion 120 of the fiber structure 100.

The invention claimed is:

1. A method of making a structure woven as a single piece by multilayer weaving and including at least one hollow portion, the method comprising:
   weaving warp yarns of at least a first set of layers of warp yarns with weft yarns including at least some weft yarns that are taken over a distance that is greater than a width of the first set of layers of warp yarns measured in a weft direction to have weft yarn end portions available that extend beyond a zone of weaving;
   returning the end portions of the weft yarns so as to weave the end portions of the weft yarns with warp yarns by reinserting the end portions of the weft yarns in layers of warp yarns; and
   forming the hollow portion by looping the first woven set of layers of warp yarns back onto itself and applying traction to the ends of the reinserted weft yarns, the hollow portion being entirely defined by a multilayer woven wall including a plurality of layers of yarns interlinked by weaving throughout a thickness of the wall.

2. A method according to claim 1, wherein the end portions of the weft yarns are reinserted in layers of warp yarns of a second set of layers of warp yarns, the first and second sets of layers of warp yarns being superposed and connected together over a fraction only of the width in the weft direction of the first set of warp yarns.

3. A method according to claim 1, wherein the end portions of the weft yarns are reinserted in layers of warp yarns of the first set of layers of warp yarns at locations that are offset in the warp direction relative to locations of their initial insertion.

4. A method according to claim 1, wherein the hollow portion is formed over a fraction only of the length of the woven structure in the warp direction.

5. A method of making a structure woven as a single piece by multilayer weaving and including at least one hollow portion that is longitudinally partitioned, the method comprising:
   weaving warp yarns of a first set of layers of warp yarns with weft yarns including at least some that are inserted in layers of warp yarns of the first set of layers of warp yarns while being taken over a distance that is greater than a length of the first set of layers of warp yarns measured in a weft direction to have weft yarn end portions available that extend beyond a zone of weaving;
   weaving warp yarns of a second set of layers of warp yarns with weft yarns including at least some that are inserted in layers of warp yarns of the second set of layers of warp yarns while being taken over a distance that is greater than a length of the second set of layers of warp yarns measured in the weft direction to have weft yarn end portions available that extend beyond the zone of weaving, the first and second sets of layers of warp yarns being arranged one above another and being interlinked over a fraction only of their width in the weft direction;
   returning the weft yarn end portions so as to weave the weft yarn end portions with warp yarns by reinserting the weft yarn end portions in layers of warp yarns; and
   forming the partitioned hollow portion by looping the first and second sets of layers of warp yarns back onto themselves and applying traction to the ends of the reinserted weft yarns, the hollow portion being entirely defined by a multilayer woven wall including a plurality of layers of yarns interlinked by weaving throughout a thickness of the wall.

6. A method according to claim 5, wherein the free end portions of the weft yarns are reinserted in layers of warp yarns of a third set of layers of warp yarns, the first, second, and third sets of warp yarns being superposed, and the first and second sets of layers of warp yarns being interlinked with the third set of layers of warp yarns over a fraction only of their width.

7. A method according to claim 5, wherein the end portions of the weft yarns are reinserted in layers of warp yarns of the first and second sets of layers of warp yarns at locations that are offset in the warp direction relative to locations of their initial insertion.

8. A method according to claim 5, wherein the hollow portion is formed over a fraction only of the length of the woven structure in the warp direction.

9. A method according to claim 1, further comprising impregnating the structure with a resin.

10. A method according to claim 5, further comprising impregnating the structure with a resin.

* * * * *